United States Patent
Lee et al.

(10) Patent No.: US 9,428,676 B2
(45) Date of Patent: Aug. 30, 2016

(54) ADHESIVE COMPOSITION FOR POLARIZING PLATE, POLARIZING PLATE USING THE SAME, AND OPTICAL DISPLAY INCLUDING THE SAME

(71) Applicant: Samsung SDI Co., Ltd., Yongin-si, Gyeonggi-do (KR)

(72) Inventors: Tae Hyun Lee, Uiwang-si (KR); Mi Yeon Yu, Uiwang-si (KR); Do Heon Lee, Uiwang-si (KR); In Cheon Han, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/453,234

(22) Filed: Aug. 6, 2014

(65) Prior Publication Data
US 2015/0043069 A1   Feb. 12, 2015

(30) Foreign Application Priority Data
Aug. 9, 2013  (KR) .................. 10-2013-0095029

(51) Int. Cl.
| G02B 5/30 | (2006.01) |
| C09J 133/08 | (2006.01) |
| C09J 143/04 | (2006.01) |
| C09J 163/00 | (2006.01) |

(52) U.S. Cl.
CPC ............. *C09J 163/00* (2013.01); *C09J 133/08* (2013.01); *C09J 143/04* (2013.01); *G02B 5/3033* (2013.01)

(58) Field of Classification Search
CPC .. G02B 5/3025; G02B 5/3033; G02B 5/305; C09J 163/00; C09J 143/04; C09J 133/08
USPC .......... 359/483.01, 487.01, 487.02; 156/329, 156/330
See application file for complete search history.

(56) References Cited

U.S. PATENT DOCUMENTS

| 5,759,643 | A | * | 6/1998 | Miyashita | ............... | C03C 17/42 428/1.31 |
| 2008/0033109 | A1 | * | 2/2008 | Tomita | ................... | C09J 133/02 525/100 |
| 2009/0162577 | A1 | * | 6/2009 | Inoue | .................... | C09J 133/08 428/1.54 |
| 2009/0208741 | A1 | * | 8/2009 | Toyama | ................. | C08G 18/10 428/355 AC |
| 2010/0129569 | A1 | | 5/2010 | Park et al. | | |
| 2010/0253886 | A1 | * | 10/2010 | Kim | ..................... | C09D 133/14 349/96 |
| 2011/0141409 | A1 | * | 6/2011 | Ashida | ................. | G02B 5/3033 349/96 |

(Continued)

FOREIGN PATENT DOCUMENTS

| CN | 101331202 A | | 12/2008 |
| JP | 2011-219548 | * | 11/2011 |

(Continued)

OTHER PUBLICATIONS

KIPO Office action dated Oct. 26, 2015 issued in KR Application No. 10-2013-0095029, with English translation, 9 pages.

*Primary Examiner* — Ricky D Shafer
(74) *Attorney, Agent, or Firm* — Lewis Roca Rothgerber Christie, LLP

(57) ABSTRACT

An adhesive composition for polarizing plates includes an epoxy compound, a (meth)acrylic compound, an alkoxysilane compound including at least one epoxy group, and an alkoxysilane compound including at least one (meth)acrylate group. A polarizing plate using the adhesive composition can exhibit good adhesion, reliability, durability, water resistance, and high temperature/high humidity resistance. An optical apparatus includes the polarizing plate.

17 Claims, 1 Drawing Sheet

(56) References Cited

U.S. PATENT DOCUMENTS

| | | | |
|---|---|---|---|
| 2013/0094083 A1* | 4/2013 | Ishii | C09J 133/04 359/483.01 |
| 2013/0244041 A1 | 9/2013 | Cho et al. | |
| 2013/0251990 A1* | 9/2013 | Higashi | C09J 133/066 428/355 AC |
| 2014/0000482 A1* | 1/2014 | Lee | G02B 1/105 106/287.21 |
| 2014/0162044 A1* | 6/2014 | Lee | C09J 133/066 428/220 |
| 2015/0017448 A1* | 1/2015 | Suwa | C09J 133/14 428/414 |
| 2015/0104650 A1* | 4/2015 | Yu | G02B 1/10 428/414 |

FOREIGN PATENT DOCUMENTS

| | | |
|---|---|---|
| JP | 2012-140610 A | 7/2012 |
| KR | 10-2010-0011179 A | 2/2010 |
| WO | WO 2012/039581 A2 | 3/2012 |

\* cited by examiner

ADHESIVE COMPOSITION FOR POLARIZING PLATE, POLARIZING PLATE USING THE SAME, AND OPTICAL DISPLAY INCLUDING THE SAME

CROSS-REFERENCE TO RELATED APPLICATION

This patent application claims priority to and the benefit of Korean Patent Application No. 10-2013-0095029, filed on Aug. 9, 2013, in the Korean Intellectual Property Office, the entire content of which is incorporated herein by reference.

BACKGROUND

1. Field

Embodiments of the present invention relate to an adhesive composition for polarizing plates, a polarizing plate using the adhesive composition, and an optical display including the polarizing plate.

2. Description of the Related Art

An adhesive is often used in polarizing plates to bond a protective film to one or both surfaces of a polarizer that includes a PVA film. However, when the adhesive is a hydrophilic and water-soluble water-based PVA adhesive, the heat from a backlight unit may change the dimensions of the polarizing plate, resulting in a distortion due to such dimensional change that is localized in a portion of a screen. Accordingly, when a black color is displayed on the screen, significant light leakage can occur (e.g. a rainbow stain may appear, which indicates a partial light leakage).

When the adhesive is a cationic polymerizable UV curable adhesive, a "dark reaction" (post-polymerization) may occur after UV irradiation stops and the cured product is wound into a roll for storage. In addition, cationic polymerizable UV curable adhesives are easily affected by humidity upon curing and are likely to suffer from deviations of the curing state. Thus, to realize a uniform curing state, strict controls must be placed on environmental humidity and the moisture content of the PVA polarizer.

In recent years, polarizing plates have been used in extreme and severe environments, giving rise to an increased demand for polarizing plates exhibiting reliable moisture resistance under severe moisture environments, such as high humidity environments, water immersion environments and the like.

SUMMARY

An aspect of embodiments of the present invention is directed to an adhesive composition for polarizing plates including (A) an epoxy compound, (B) a (meth)acrylic compound, (C) an alkoxysilane compound containing at least one epoxy group, and (D) an alkoxysilane compound containing at least one (meth)acrylate group.

Another aspect of embodiments of the present invention is directed to a polarizing plate including a polarizer and a protective film on one surface or both surfaces of the polarizer. The protective film and the polarizer are bonded via an adhesive layer, which includes the adhesive composition for polarizing plates.

A further aspect of embodiments of the present invention is directed to an optical apparatus including the polarizing plate.

DETAILED DESCRIPTION

Figure 1:
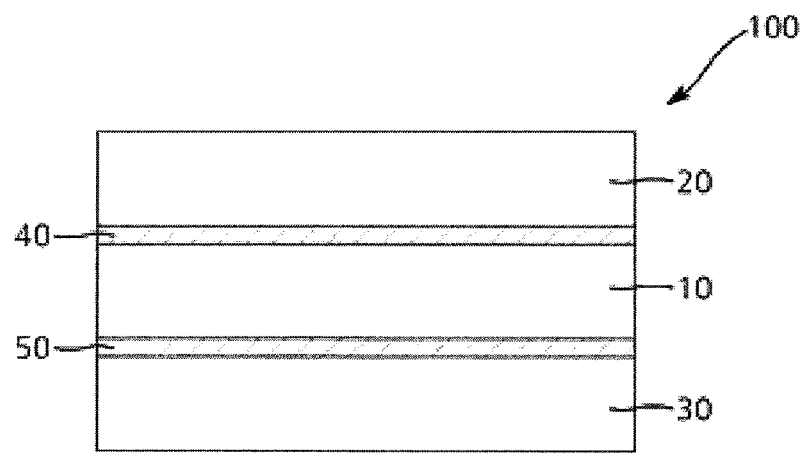
FIG. 1 is a schematic cross-sectional view of a polarizing plate according to one embodiment of the present invention.

Herein, embodiments of the present invention are described with reference to the accompanying drawings. It should be understood that the present invention may be embodied in different ways and is not limited to the following embodiments. In the drawings, portions unimportant to the description are omitted for clarity. Like components are denoted by like reference numerals throughout the specification and drawings. As used herein, the term "compound" includes at least one compound selected from monomers, oligomers and resins, and the term "(meth)acryl" and similar terms may refer to acryl and/or methacryl.

According to one embodiment of the present invention, an adhesive composition for polarizing plates may bond a protective film to one surface of a polarizer and may include (A) an epoxy compound, (B) a (meth)acrylic compound, (C) an alkoxysilane compound containing at least one epoxy group, and (D) an alkoxysilane compound containing at least one (meth)acrylate group.

Epoxy Compound

In one embodiment, the epoxy compound has structural rigidity, and may provide good reliability to the adhesive layer and improve adhesion between the polarizer and the protective film. In addition, the epoxy compound allows for the physical twist of molecular chains between the epoxy compound and the (meth)acrylic compound, and for chain transfer to a hydrophilic group of the (meth)acrylic compound, thereby providing cohesion to the adhesive layer.

In one embodiment, the epoxy compound has a high glass transition temperature (Tg) and may improve durability of the adhesive layer. In addition, since the adhesive layer is a cured product of the composition including the epoxy compound, the cured epoxy compound may support the structure of the adhesive layer and provide interfacial adhesion between the polarizer and the protective film through good wettability and chemical bonding by a hydroxyl group generated upon curing. In one embodiment, the epoxy compound may have a Tg of about 50° C. to bout 250° C., for example, about 100° C. to about 200° C. Within any of these ranges, the epoxy compound may improve durability of the polarizing plate, and provide interfacial adhesion between the polarizer and the protective film.

The epoxy compound may include a non-silicon epoxy compound not including silicon (Si), a non-silane epoxy compound not including silane groups, or a non-alkoxysilane epoxy compound not including alkoxysilane groups. In one embodiment, the epoxy compound includes an epoxy cationic compound. In one embodiment, the epoxy compound may include at least one of an alicyclic epoxy compound, an aromatic epoxy compound, an aliphatic epoxy compound, and/or a hydrogenated epoxy compound.

The alicyclic epoxy compound may refer to a compound in which an alicyclic ring has at least one epoxy group. For example, the alicyclic epoxy compound may include alicyclic diepoxy carboxylate. Additional non-limiting examples of the alicyclic epoxy compound may include 3,4-epoxycyclohexylmethyl-3',4'-epoxycyclohexanecarboxylate, 2-(3,4-epoxycyclohexyl-5,5-spiro-3,4-epoxy)cyclohexane-methdioxane, bis(3,4-epoxycyclohexylmethyl)adipate, bis(3,4-epoxy-6-methylcyclohexyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexanecarboxylate, trimethylcaprolactone-modified 3,4-epoxycyclohexylmethyl-3',4'-epoxycyclohexanecarboxylate, β-methyl-δ-valerolactone-modified 3,4-epoxycyclohexylmethyl-3',4'-epoxycyclohexanecarboxylate, methylenebis(3,4-epoxycyclohexane), di(3,4-epoxycyclohexylmethyl)ether of ethylene glycol, ethylenebis(3,4-epoxycyclohexanecarboxylate), epoxycyclohexahydro dioctylphthalate, epoxycyclohexahydro di-2-ethylhexylphthalate, or the like.

Non-limiting examples of the aromatic epoxy compound may include at least one epoxy group-containing bisphenol A and/or F, phenol novolac, cresol novolac, bisphenol A-novolac, dichloropentadiene novolac, glycidyl ether of triphenylmethane, triglycidyl para-aminophenol, tetraglycidyl methylene dianiline, or the like.

Non-limiting examples of the aliphatic epoxy compound may include 1,4-butanediol diglycidyl ether, 1,6-hexanediol diglycidyl ether, neopentyl glycol diglycidyl ether, trimethylolpropane triglycidyl ether, polyethylene glycol diglycidyl ether, glycerin triglycidyl ether, a polypropylene glycol diglycidyl ether; a polyglycidyl ether of a polyether polyol obtained by adding at least one alkylene oxide to an aliphatic polyvalent alcohol such as ethylene glycol, propylene glycol, glycerin or the like; a diglycidyl ether of an aliphatic long-chain dibasic acid; a monoglycidyl ether of an aliphatic higher alcohol; a glycidyl ether of a higher fatty acid; epoxidized soybean oil; butyl epoxy stearate; octyl epoxy stearate; epoxidized linseed oil; epoxidized polybutadiene; or the like.

The hydrogenated epoxy compound may refer to a resin obtained by selectively performing hydrogenation of an aromatic epoxy resin in the presence of a catalyst under pressure. Non-limiting examples of the aromatic epoxy resin may include a bisphenol type epoxy resin, such as a diglycidyl ether of bisphenol A, a diglycidyl ether of bisphenol F, a diglycidyl ether of bisphenol S, or the like; a novolac type epoxy resin, such as a phenol novolac epoxy resin, a cresol novolac epoxy resin, and/or a hydroxybenzaldehyde phenol novolac epoxy resin; a polyfunctional epoxy resin, such as a glycidyl ether of tetrahydroxyphenylmethane, a glycidyl ether of tetrahydroxybenzophenone, and/or an epoxidized polyvinyl phenol; or the like. The hydrogenated epoxy compound may be obtained by adding hydrogen to any of these aromatic epoxy resins. In one embodiment, the hydrogenated epoxy compound may be, for example, a hydrogenated glycidyl ether of bisphenol A.

The epoxy compound may be present in an amount of about 1 weight % (wt %) to about 90 wt % based on the total weight of (A)+(B)+(C)+(D) (i.e., the total weight of (A) the epoxy compound, (B) the (meth)acrylic compound, (C) the alkoxysilane compound containing at least one epoxy group, and (D) the alkoxysilane compound containing at least one (meth)acrylate group). Within this range, the adhesive composition may exhibit good adhesion between the polarizer and the protective film, and may prevent (or reduce) deterioration in wettability to the polarizer due to excessive increase in viscosity of the adhesive composition. In addition, breakage of the adhesive layer due to excessive increase in modulus can be prevented (or reduced), and the adhesive layer may exhibit good crack resistance and cuttability. In one embodiment, the epoxy compound may be present in an amount of about 40 wt % to about 90 wt %, for example, about 45 wt % to about 60 wt %, based on the total weight of (A)+(B)+(C)+(D).

In some embodiments, the epoxy compound may be present in the adhesive composition in an amount of about 9 wt % to about 90 wt %, and in some embodiments, about 10 wt % to about 90 wt %, about 30 wt % to about 90 wt %, about 30 wt % to about 60 wt %, about 40 wt % to about 90 wt %, or about 45 wt % to about 60 wt % in terms of solids content. Within any of these ranges, the adhesive composition can exhibit good adhesion between the polarizer and the protective film, and can prevent (or reduce) deterioration in wettability to a substrate due to an increase in viscosity of the composition. In addition, breakage of the adhesive layer due to excessive increase in storage modulus of the adhesive layer can be prevented (or reduced), and the adhesive layer can exhibit good crack resistance and cuttability.

(Meth)Acrylic Compound

The (meth)acrylic compound may include a photopolymerizable compound (a compound polymerized by a radical arising from optical energy). In one embodiment, the (meth)acrylic compound has high reactivity without inhibiting the reaction due to moisture in the polarizer. In addition, the (meth)acrylic compound may provide interfacial adhesion between the polarizer and the protective film, and can participate in chain transfer bonding to the activated epoxy compound.

The (meth)acrylic compound may include a non-silicon (meth)acrylic compound not inlcuding silicon (Si), a non-silane (meth)acrylic compound not including silane groups, or a non-alkoxysilane (meth)acrylic compound not including alkoxysilane groups.

In one embodiment, the (meth)acrylic compound includes a radically curable (meth)acrylic compound, and may include at least one of a monofunctional (meth)acrylate (b1) and/or a polyfunctional (meth)acrylate (b2). The "monofunctional (meth)acrylate" may include one (meth)acryl functional group, and the "polyfunctional (meth)acrylate" may include at least two (meth)acryl functional groups, for example, two to six (meth)acryl functional groups.

The monofunctional (meth)acrylate (b1) may be a monofunctional (meth)acrylate having at least one hydrophilic group. The hydrophilic group may be a hydroxyl group or a carboxylic acid group. In one embodiment, the hydrophilic group may be a hydroxyl group.

The monofunctional (meth)acrylate (b1) may be a $C_1$ to $C_{20}$ alkyl group-containing monofunctional (meth)acrylate having at least one hydrophilic group, a $C_3$ to $C_{20}$ alicyclic group-containing monofunctional (meth)acrylate having at least one hydrophilic group, or a $C_6$ to $C_{20}$ aromatic group-containing monofunctional (meth)acrylate having at least one hydrophilic group.

In one embodiment, the monofunctional (meth)acrylate (b1) may include at least one of 2-hydroxyethyl(meth)acrylate, 4-hydroxybutyl(meth)acrylate, 2-hydroxypropyl(meth)acrylate, 2-hydroxybutyl(meth)acrylate, 6-hydroxyhexyl(meth)acrylate, 1,4-cyclohexanedimethanol mono(meth)acrylate, 1-chloro-2-hydroxypropyl(meth)acrylate, diethylene glycol mono(meth)acrylate, 1,6-hexanediol mono(meth)acrylate, 2-hydroxy-3-phenyloxypropyl(meth)acrylate, 4-hydroxycyclopentyl(meth)acrylate, 2-hydroxy-3-phenyloxybutyl(meth)acrylate, and/or 4-hydroxycyclohexyl(meth)acrylate, but the monofunctional (meth)acrylate (b1) is not limited thereto. The monofunctional (meth)acrylate (b1) may be present in an amount of about 30 wt % to about 100 wt %, for example, about 30 wt % to about 50 wt %, or about 30 wt % to about 40 wt %, based on the total weight of the monofunctional (meth)acrylate (b1) and the polyfunctional (meth)acrylate (b2) in terms of solids content. Within any of these ranges, the adhesive composition may exhibit interfacial adhesion to the adherends (i.e. the polarizer and the protective film) due to a plurality of hydrogen bonds.

The polyfunctional (meth)acrylate (b2) may improve the cross-linking density of the radically cured product, thus improving the cohesive energy of the adhesive composition and, consequently, reliability of the adhesive composition. The polyfunctional (meth)acrylate (b2) may include at least one hydrophilic group. The hydrophilic group may be a hydroxyl group or a carboxylic acid group. In one embodiment, the hydrophilic group may be a hydroxyl group.

The polyfunctional (meth)acrylate (b2) may be a (meth)acrylate of a polyhydric alcohol having at least two hydroxyl groups, for example, two to six hydroxyl groups. In one embodiment, the polyfunctional (meth)acrylate (b2) may include at least one of trimethylolpropane tri(meth)acrylate, trimethylolpropane trioxyethyl(meth)acrylate, tris(2-acryloxyethyl) isocyanurate, pentaerythritol tri(meth)acrylate, and/or a mixture thereof. In one embodiment, a tris(2-acryloxyethyl) isocyanurate may be included as a polyfunctional (meth)acrylate (b2) having an isocyanurate group. The polyfunctional (meth)acrylate (b2) may be present in an amount of about 0 wt % to about 70 wt %, for example, about 0 wt % to about 20 wt %, about 1 wt % to about 20 wt %, about 15 wt % to about 20 wt %, or about 19 wt % to about 20 wt %, based on the total weight of the monofunctional (meth)acrylate (b1) and the polyfunctional (meth)acrylate (b2). Within any of these ranges, deterioration in adhesion of the adhesive composition due to curing shrinkage may be prevented (or reduced).

The (meth)acrylic compound may be present in an amount of about 9 wt % to about 90 wt %, for example, about 10 wt % to about 90 wt %, about 20 wt % to about 60 wt %, or about 38 wt % to about 50 wt %, based on the total weight of (A)+(B)+(C)+(D). Within any of these ranges, low adhesion of the adhesive composition due to deterioration in cohesion, as well as deterioration in reliability due to tack caused by deterioration in interfacial adhesion and storage modulus, may be prevented (or reduced). In addition, the adhesive composition may exhibit good water resistance by preventing (or reducing) decolorization of the polarizer upon immersion in hot water.

The (meth)acrylic compound may be present in the adhesive composition in an amount of about 9 wt % to about 90 wt %, for example, about 10 wt % to about 90 wt %, about 20 wt % to about 90 wt %, about 30 wt % to about 60 wt %, or about 40 wt % to about 50 wt %, in terms of solids content. Within any of these ranges, deterioration in adhesion of the adhesive composition due to deterioration in cohesion of the cured product upon curing may be prevented (or reduced), and the adhesive composition may prevent (or reduce) decolorization of the polarizer and deterioration in water resistance due to deterioration in interfacial adhesion and modulus upon immersion in hot water.

The adhesive composition may have a weight ratio of the (A) epoxy compound to the (B) (meth)acrylic compound of about 50:50 to about 90:10, based on 100 parts by weight of (A)+(B). Within this range, the adhesive composition may exhibit improved adhesion between the polarizer and the protective film and high reliability.

The (A) epoxy compound may be present in an amount of about 40 parts by weight to about 99.9 parts by weight, and the (B) (meth)acrylic compound may be present in an amount of about 0.1 parts by weight to about 60 parts by weight, based on 100 parts by weight of (A)+(B). Within any of these ranges, the adhesive composition may exhibit improved adhesion between the polarizer and the protective film and high reliability. In one embodiment, the (A) epoxy compound may be present in an amount of about 50 parts by weight to about 60 parts by weight, and the (B) (meth)acrylic compound may be present in an amount of about 40 parts by weight to about 50 parts by weight, based on 100 parts by weight of (A)+(B).

Alkoxysilane Compound

A typical adhesive composition for polarizing plates including either an epoxy compound, or a (meth)acrylic compound, or a mixture thereof may improve cohesion by enabling a physical molecular chain twist between the epoxy compound and the (meth)acrylic compound and chemical bonding by chain transfer of the hydroxyl group included in the epoxy compound with the (meth)acrylic compound. However, while these adhesive compositions may maintain adhesion under general humidity conditions (i.e. 60° C., 90% RH), they may suffer from deterioration in adhesion under high humidity conditions (for example, during water immersion), and, as a result, the protective film may be separated from the polarizer.

In contrast, in embodiments of the present invention, when the alkoxysilane compound reacts with external moisture, alkoxy groups are separated, and the alkoxysilane compound forms a Si—O—Si bond through condensation between the generated silanols (Si—OH). As a result, the adhesive composition exhibits improved adhesion even when the polarizing plate including the adhesive composition is under high humidity conditions. Specifically, since the alkoxysilane compound significantly improves cohesion of the adhesive composition or the adhesive layer even under high humidity conditions (e.g. during water immersion causing inflow of a lot of water), the alkoxysilane compound may serve to improve adhesion of the polarizing plate under high humidity conditions. In addition, since the alkoxysilane compound includes at least one of epoxy and/or (meth)acrylate groups, the alkoxysilane compound may further improve cohesion or adhesion of the adhesive composition for polarizing plates or the adhesive layer by curing the reaction with the epoxy compound or the (meth)acrylic compound.

The alkoxysilane compound may include a silicon (Si), to which at least one alkoxy group is bonded. The alkoxysilane compound may further contain epoxy groups and/or (meth)acrylate groups. In one embodiment, the alkoxysilane compound includes at least one epoxy group. In embodiments of the present invention, the (C) alkoxysilane compound containing at least one epoxy group is represented by Formula 1.

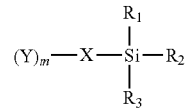

Formula 1

In Formula 1, $R_1$, $R_2$ and $R_3$ are each independently hydrogen, a $C_1$ to $C_5$ alkyl group, a $C_1$ to $C_5$ alkoxy group, a $C_5$ to $C_{10}$ cycloalkyl group, or a $C_6$ to $C_{10}$ aryl group, and at least one of $R_1$, $R_2$ and $R_3$ is a $C_1$ to $C_5$ alkoxy group; X is a $C_1$ to $C_{10}$ aliphatic hydrocarbon group or a $C_6$ to $C_{20}$ aromatic hydrocarbon group; Y is a glycidoxy group, a glycidoxy group-containing $C_1$ to $C_{10}$ aliphatic hydrocarbon group, or an epoxy group-containing $C_5$ to $C_{10}$ alicyclic group; and m is an integer of 1 to 3.

In one embodiment, X may be a $C_1$ to $C_{10}$ alkyl group or a $C_1$ to $C_{10}$ alkylene group, and Y may be a glycidoxy group, an epoxycyclopentyl group or an epoxycyclohexyl group. For example, the alkoxysilane compound containing at least one epoxy group may include at least one of 3-glycidoxypropyltrimethoxysilane and/or [2-(3,4-epoxycyclohexyl)ethyl]trimethoxysilane, without being limited thereto.

In another embodiment, the alkoxysilane includes at least one (meth)acrylate group. The (D) alkoxysilane compound containing at least one (meth)acrylate group is represented by Formula 2:

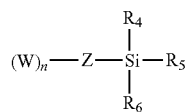

Formula 2

In Formula 2, $R_4$, $R_5$ and $R_6$ are each independently hydrogen, a $C_1$ to $C_5$ alkyl group, a $C_1$ to $C_5$ alkoxy group, a $C_5$ to $C_{10}$ cycloalkyl group, or a $C_6$ to $C_{10}$ aryl group, and at least one of $R_4$, $R_5$ and $R_6$ is a $C_1$ to $C_5$ alkoxy group; Z is a $C_1$ to $C_{10}$ aliphatic hydrocarbon group or a $C_6$ to $C_{20}$ aromatic hydrocarbon group; W is an acrylate group or a methacrylate group; and n is an integer of 1 to 3.

In one embodiment, $R_4$, $R_5$ and $R_6$ may each independently be a $C_1$ to $C_5$ alkoxy group, and Z may be a $C_1$ to $C_5$ linear alkyl group, $C_3$ to $C_5$ branched alkyl group, a $C_1$ to $C_5$ linear alkylene group or $C_4$ to $C_5$ branched alkylene group. For example, the alkoxysilane including at least one (meth)acrylate group may include at least one of 3-(meth)acryloxypropyltrimethoxysilane and/or 3-(meth)acryloxypropyltriethoxysilane.

In the adhesive composition, the (C) alkoxysilane compound containing at least one epoxy group may be present in an amount of about 0.1 wt % to about 5 wt %, for example, about 0.1 wt % to about 3 wt % or about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 or 5.0 wt %, based on the total amount of (A)+(B)+(C)+(D) in terms of solids content. Within any of these ranges, the adhesive composition may exhibit improved durability during the reaction with external moisture by allowing appropriate copolymerization to take place, while preventing (or reducing) deterioration in the total degree of curing of (A).

In the adhesive composition, the (D) alkoxysilane compound containing at least one (meth)acrylate group may be present in an amount of about 0.1 wt % to about 5 wt %, for example, about 0.1 wt % to about 3 wt % or about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 or 5.0 wt %, based on the total weight of (A)+(B)+(C)+(D) in terms of solids content. Within any of these ranges, the adhesive composition may exhibit improved durability during the reaction with external moisture by allowing appropriate copolymerization to take place, while preventing (or reducing) deterioration in the total degree of curing of (B).

In one embodiment, the (C) alkoxysilane compound containing at least one epoxy group may be present in the adhesive composition in an amount of about 0.01 wt % to about 5 wt %, for example, about 0.01 wt % to about 3 wt %, about 0.01 wt % to about 1 wt %, or about 0.01, 0.05, 0.1, 0.2, 0.3, 0.4, 0.5, 0.6, 0.7, 0.8, 0.9 or 1 wt %, in terms of solids content. Within any of these ranges, the adhesive composition may exhibit good adhesion under humidification conditions, and deterioration in adhesion and reliability due to deterioration in degree of curing may be prevented (or reduced).

In one embodiment, the (D) alkoxysilane compound containing at least one (meth)acrylate group may be present in the adhesive composition in an amount of about 0.01 wt % to about 3 wt %, for example, about 0.01 wt % to about 1 wt %, or about 0.01, 0.05, 0.1, 0.2, 0.3, 0.4, 0.5, 0.6, 0.7, 0.8, 0.9 or 1 wt %, in terms of solids content.

Within any of these ranges, the adhesive composition may exhibit good adhesion under humid conditions, and deterioration in adhesion and reliability due to deterioration in the degree of curing may be prevented (or reduced).

In one embodiment, the alkoxysilane compound may be present in the adhesive composition in an amount of about 0.01 wt % to about 12 wt %, for example, about 0.1 wt % to about 6 wt %, or, about 0.1, 1, 2, 3, 4, 5 or 6 wt %, in terms of solids content. Within any of these ranges, the adhesive composition may exhibit good adhesion under humid conditions, and deterioration in adhesion and reliability due to deterioration in the degree of curing may be prevented (or reduced).

In one embodiment, the adhesive composition includes both (A) and (C), which each contain an epoxy group, and both (B) and (D), which each contain a (meth)acrylate group, thereby realizing an adhesive layer exhibiting good moisture resistance in wet environments, such as, for example, high humidity environments, environments in which the adhesive composition is immersed in water, and the like. In one embodiment, the adhesive composition may have a weight ratio of (A)/(C) of about 15 to about 500, for example of about 50 to about 500, and a weight ratio of (B)/(D) of about 15 to about 500, for example of about 50 to about 500. Within these ranges, the adhesive layer including the adhesive composition may exhibit good moisture resistance in wet environments, such as high humidity environments, environments in which the adhesive composition is immersed in water, and the like.

In the adhesive composition, (C)+(D) (where (C) is the alkoxysilane compound containing at least one epoxy group and (D) is the alkoxysilane compound containing at least one (meth)acrylate group) may be present in an amount of about 0.01 wt % to about 10 wt %, for example, about 0.1 wt % to about 10 wt %, about 0.2 wt % to about 6 wt %, or about 0.1, 1, 2, 3, 4, 5, 6, 7, 8, 9 or 10 wt %, based on the total weight of (A)+(B)+(C)+(D). Within any of these ranges, the adhesive composition may have minimal (or reduced) interference with the function of the main material of each curing system, and may exhibit improved water resistance by increasing the degree of cross-linking during the reaction with external moisture.

The adhesive composition may have a weight ratio of (C):(D) of about 1:0.5 to about 1:2, for example, of about 1:0.5 to about 1:1. Within any of these ranges, the adhesive composition may exhibit improved durability through appropriate cross-linking.

The adhesive composition may further include at least one of (E) a photosensitizer and (F) a photoacid generator.

Photosensitizer

In one embodiment, the photosensitizer serves as a catalyst for a photoacid generator and may catalyze a curing reaction by generating a small amount of radicals. The photosensitizer may include photosensitizers such as phosphorus, triazine, acetophenone, benzophenone, thioxanthone, benzoin, oxime photosensitizers, or mixtures thereof. In one embodiment, the photosensitizer may include a phosphorus photosensitizer, such as bisbenzoylphenyl phosphine oxide, benzoyldiphenyl phosphine oxide, or a mixture thereof.

The photosensitizer may be present in an amount of about 0.1 parts by weight to about 10 parts by weight, for example, about 0.5 parts by weight to about 6.0 parts by weight, based on 100 parts by weight of (A)+(B)+(C)+(D). Within any of these ranges, the (meth)acrylic compound may be sufficiently cured and may improve reactivity of the photoacid generator at a light intensity according to process conditions.

Photoacid Generator

The photoacid generator may be a photocationic initiator, and may include any suitable photocationic initiator, so long as it is capable of performing a photocuring reaction.

The photoacid generator may include an onium ion as a cation, and a corresponding anion to prepare an onium salt. Non-limiting examples of the cation of the onium salt may include diaryliodonium, such as diphenyliodonium, 4-methoxydiphenyliodonium, bis(4-methylphenyl)iodonium, bis(4-tert-butylphenyl)iodonium, bis(dodecylphenyl)iodonium and the like; triarylsulfonium, such as triphenylsulfonium, diphenyl-4-thiophenoxyphenylsulfonium and the like; bis[4-(diphenylsulfonio)-phenyl]sulfide, bis[4-(di(4-(2-hydroxyethyl)phenyl)sulfonio)-phenyl]sulfide, 5-2,4-(cyclopentadienyl)[1,2,3,4,5,6-η]-(methylethyl)-benzene]-iron (1+), or the like. Non-limiting examples of the anion of the onium salt may include tetrafluoroborate ($BF_4^-$), hexafluorophosphate ($PF_6^-$), hexafluoroantimonate ($SbF_6^-$), hexafluoroarsenate ($AsF_6^-$), hexachloroantimonate ($SbCl_6^-$), or the like.

The photoacid generator may be present in an amount of about 0.1 parts by weight to about 10 parts by weight, for example, about 0.1 parts by weight to about 6 parts by weight, based on 100 parts by weight of (A)+(B)+(C)+(D). Within any of these ranges, the epoxy compound may be sufficiently polymerized and residual initiator may be prevented or reduced.

In one embodiment, the adhesive composition for polarizing plates may include about 30 wt % to about 60 wt % of (A), about 30 wt % to about 60 wt % of (B), about 0.01 wt % to about 3 wt % of (C), about 0.01 wt % to about 3 wt % of (D), about 0.01 wt % to about 5 wt % of (E), and about 0.01 wt % to about 5 wt % of (F).

The adhesive composition for polarizing plates may be prepared by mixing the epoxy compound, the (meth)acrylic compound, the alkoxysilane compound, the photosensitizer, and the photoacid generator.

The adhesive composition for polarizing plates may include further additives such as antioxidants, UV absorbers, ionic conductive agents, conductivity imparting agents such as conductive metal oxide particles and the like, light diffusivity imparting agents, viscosity modifiers, and the like. The additives may be present in any suitable amount, so long as they do not interfere with the effects and functions of the other components according to embodiments of the present invention.

In one embodiment, the adhesive composition for polarizing plates is prepared by mixing the aforementioned components, and may have a viscosity at 25° C. of less than about 150 cPs. Within this range, the adhesive composition may exhibit good coatability. In one embodiment, the adhesive composition has a viscosity of about 1 cPs to about 135 cPs, about 20 cPs to about 135 cPs, or about 20 cPs to about 100 cPs.

In accordance with another embodiment of the present invention, a polarizing plate may include an adhesive layer including the adhesive composition for polarizing plates described above.

FIG. 1 is a schematic cross-sectional view of a polarizing plate according to one embodiment of the present invention. Referring to FIG. 1, a polarizing plate 100 may include a polarizer 10, a first protective film 20 on a first surface (e.g. an upper surface) of the polarizer 10, a second protective film 30 on a second surface (e.g. a lower surface) of the polarizer 10, a first adhesive layer 40 between the first protective film 20 and the polarizer 10, and a second adhesive layer 50 between the second protective film 30 and the polarizer 10. At least one of the first and second adhesive layers 40 and 50 may include the adhesive composition for polarizing plates according to embodiments of the present invention.

As used herein, terms such as "upper surface" and "lower surface" are defined with reference to the accompanying drawings. Thus, it will be understood that the term "upper surface" may be used interchangeably with the term "lower surface", depending on the orientation.

FIG. 1 illustrates adhesive layers 40 and 50 (each including the adhesive composition according to embodiments of the present invention) positioned on both upper and lower (e.g. first and second) surfaces of the polarizer. Alternatively, the adhesive layer may be positioned on only one surface of the polarizer.

The polarizer may be prepared from a film formed of a polyvinyl alcohol resin. The polyvinyl alcohol resin may include saponified products of polyvinyl alcohol, polyvinyl formal, polyvinyl acetal, ethylene vinyl acetate copolymer, or the like. The film formed of a polyvinyl alcohol resin may have a degree of saponification of about 99% or greater, for example, of about 99% to about 99.5%, and a degree of polymerization of about 2000 or greater, for example, of about 2000 to about 2500. The polarizer or the film formed of a polyvinyl alcohol resin may have a thickness of about 10 μm to about 200 μm. Within this range, the polarizer may be applied to a polarizing plate for an optical display.

The polarizer may be prepared by dyeing the film formed of a polyvinyl alcohol resin with iodine, followed by stretching. The film may be stretched at a stretching ratio of about 2.0 to about 6.0. After stretching, the film may be subjected to color compensation by dipping the film in a boric acid solution and in an aqueous solution of potassium iodide.

The protective film may be positioned on one or both surfaces of the polarizer, and may be any transparent film suitable for polarizing plates, without limitation. For example, the protective film may include at least one of a cellulose (e.g. triacetyl cellulose), a polyester (e.g. polyethylene terephthalate (PET)), a cycloolefin polymer (COP), a polycarbonate (PC), a polyacrylate, a polyethersulfone, a polysulfone, a polyamide, a polyimide, a polyolefin, a polyarylate, a polyvinyl alcohol, a polyvinyl chloride, and/or a polyvinylidene chloride resin.

The protective film may have a thickness of about 25 μm to about 500 μm. Within this range, the protective film may be applied to a polarizing plate when the polarizing plate is stacked on a polarizing device. In one embodiment, the protective film has a thickness of about 25 μm to about 100 μm.

The protective film may be subjected to a surface treatment (for example, corona pre-treatment at 250 mJ/cm$^2$ or greater) before coating the adhesive composition or before preparation of the polarizing plate.

The polarizing plate may have a thickness of about 50 μm to about 300 μm. Within this range, the polarizing plate may be applied to optical displays.

The polarizing plate may be prepared by any suitable method. For example, the adhesive composition may be coated onto one surface of the protective film, thereby preparing a protective film having an adhesive composition layer. Then, the adhesive composition layer may be subjected to drying and the like, if needed. The adhesive composition may be coated by any suitable coating method including, without limitation, die coating, roll coating, gravure coating, or spin coating. The protective film having the adhesive composition layer may be stacked on each of the first and second surfaces of the polarizer (e.g. upper and lower surfaces, respectively). Then, the adhesive composition layer may be cured by UV irradiation, thereby forming an adhesive layer and preparing a polarizing plate.

In one embodiment, the UV irradiation is performed at a dose of about 10 mJ/cm$^2$ to about 1,000 mJ/cm$^2$, a wavelength of about 200 nm to about 450 nm, and an irradiance of 1 mW/cm$^2$ to 500 mW/cm$^2$, but the conditions for performing the UV irradiation are not limited thereto. The UV irradiation may be performed using a metal halide lamp, or the like. The UV irradiation may be performed at about 22° C. to about 25° C., and at about 20% RH to about 60% RH (herein, RH refers to relative humidity).

According to embodiments of the present invention, the polarizing plate exhibits good cohesion and durability, and good adhesion and reliability, due to increased cross-linking density of the polarizing plate.

In accordance with a further aspect of embodiments of the present invention, an optical apparatus may include the adhesive composition for polarizing plates, an adhesive layer including the adhesive composition, and/or a polarizing plate including the adhesive layer.

In one embodiment, the optical apparatus may be a display including a polarizing plate, and may include, without limitation, a liquid crystal display, an OLED display or the like.

Figure 2:
FIG. 2 is a schematic cross-sectional view of an optical apparatus according to one embodiment of the present invention.

FIG. 2 is a schematic cross-sectional view of an optical apparatus according to one embodiment of the present invention. Referring to FIG. 2, an optical apparatus may include: a display panel 200 and a polarizing plate 110 on a first surface (e.g. an upper surface) of the display panel 200.

Hereinafter, embodiments of the present invention will be described with reference to some examples. It should be understood that these examples are provided for illustration only and are not to be construed in any way as limiting the present disclosure.

EXAMPLES

Components used in the Examples and Comparative Examples are as follows.
A. Epoxy Compound:
(A1) Bisphenol A aromatic epoxy (KDS-8218, Kukdo Chemical Co., Ltd.)
(A2) Hydrogenated epoxy (YX-8000, JER Co., Ltd.)
(A3) Alicyclic cycloepoxy (SEE-4221, Seechem Co., Ltd.)
B. (Meth)Acrylic Compound:
(B1a) 2-hydroxyethyl acrylate (100%, SK CYTEC Co., Ltd.)
(B1b) 4-hydroxybutyl acrylate (100%, Osaka Organic Co., Ltd., JAPAN)
(B2) Isocyanurate EO modified triacrylate (M-315, 100%, Toagoshei Co., Ltd.)
C. Alkoxysilane Compound Containing at Least One Epoxy Group:
(C1) 3-glycidoxypropyl trimethoxysilane (KBM-403, Shinetsu Co., Ltd.)
(C2) 2-(3,4-epoxycyclohexyl)ethyltrimethoxysilane (KBM-303, Shinetsu Co., Ltd.)
D. Alkoxysilane Compound Containing at Least One (Meth) Acrylate Group:
(D1) 3-methacryloxypropyl trimethoxysilane (KBM-503, Shinetsu Co., Ltd.)
(D2) 3-acryloxypropyl trimethoxysilane (KBM-5103, Shinetsu Co., Ltd.)
E. Photosensitizer: Thioxanthone (DETX-S, Nippon Kayaku Co., Ltd.)
F. Photoacid Generator: Iodonium Salt, Hexafluorophosphate (Irgacure-250, BASF Co., Ltd.)

Examples 1 to 9 and Comparative Examples 1 to 5

An epoxy compound, a (meth)acrylic compound, an alkoxysilane compound containing at least one epoxy group, and an alkoxysilane compound containing at least one (meth) acrylate group were mixed in amounts as listed in Table 1 (unit: parts by weight), not counting solvents.

In each Example and Comparative Example, 3 parts by weight of the photoacid generator identified above and 1 part by weight of the photosensitizer identified above were mixed with the resulting compound, thereby preparing an adhesive composition for polarizing plates.

TABLE 1

| | A | | | B | | | C | | D | |
|---|---|---|---|---|---|---|---|---|---|---|
| | A1 | A2 | A3 | B1a | B1b | B2 | C1 | C2 | D1 | D2 |
| Example 1 | 49.9 | — | — | 49.9 | — | — | 0.1 | — | 0.1 | — |
| Example 2 | 49 | — | — | 49 | — | — | 1 | — | 1 | — |
| Example 3 | 47 | — | — | 47 | — | — | 3 | — | 3 | — |
| Example 4 | 49 | — | — | 49 | — | — | 1 | — | — | 1 |
| Example 5 | 48.5 | — | — | 48.5 | — | — | 1 | 1 | — | 1 |
| Example 6 | — | 49 | — | 49 | — | — | 1 | — | — | 1 |
| Example 7 | — | 49 | — | — | 49 | — | 1 | — | — | 1 |
| Example 8 | — | — | 49 | — | 49 | — | — | 1 | — | 1 |
| Example 9 | — | — | 49 | — | 39.5 | 9.5 | — | 1 | — | 1 |
| Comparative Example 1 | 40 | — | — | 60 | — | — | — | — | — | — |
| Comparative Example 2 | 49.5 | — | — | 49.5 | — | — | 1 | — | — | — |

TABLE 1-continued

| | A | | | B | | | C | | D | |
|---|---|---|---|---|---|---|---|---|---|---|
| | A1 | A2 | A3 | B1a | B1b | B2 | C1 | C2 | D1 | D2 |
| Comparative Example 3 | 49.5 | — | — | 49.5 | — | — | — | — | 1 | — |
| Comparative Example 4 | — | — | 98 | — | — | — | 1 | — | 1 | — |
| Comparative Example 5 | — | — | — | — | 98 | — | 1 | — | 1 | — |

Preparation of Polarizing Plate

As a base film, an 80 μm thick polyvinyl alcohol film (degree of saponification: 99.5%, degree of polymerization: 2000) was used. The base film was dyed in a 0.3% aqueous iodine solution, followed by stretching at a stretching ratio of 5.0. Next, the stretched base film was subjected to color compensation in a 3% boric acid solution and in a 2% aqueous solution of potassium iodide, followed by drying at 50° C. for 4 minutes, thereby preparing a polarizer (thickness: 20 μm).

An 80 μm thick triacetyl cellulose (TAC) film was used as a first transparent protective film. The first protective film was subjected to corona treatment at 250 mJ/cm$^2$ or greater.

A 30 μm thick cycloolefin polymer resin film (herein, resins polymerized using a cyclic olefin as a polymerization unit are collectively referred to as a cycloolefin polymer (COP)) was used as a second transparent protective film. The second protective film was subjected to corona treatment at 250 mJ/cm$^2$ or greater.

The first protective film, the adhesive composition, the polarizer, and the second protective film were laminated, in this order, at 22° C. to 25° C. and at 20% RH to 60% RH, followed by UV irradiation at 400 mW/cm$^2$ and at 1000 mJ/cm$^2$ using a metal halide lamp, thereby preparing a polarizing plate.

The prepared adhesive compositions and polarizing plates were evaluated as to the following properties. Results are shown in Table 2.

(1) Adhesion

To confirm adhesion of each of the polarizing plates, a cutter was inserted between the protective film and the polarizer, at an edge of the polarizing plate. If the cutter could not be inserted between the protective film and the polarizer, the polarizing plate was rated as ⊚. If the cutter could be slightly inserted between the protective film and the polarizer, the polarizing plate was rated as O. If the protective film of the polarizing plate was torn when the cutter was even slightly inserted between the protective film and the polarizer, the polarizing plate was rated as Δ. If the cutter could be easily inserted between the protective film and the polarizer, the polarizing plate was rated as X.

(2) Adhesion after Hot Water Immersion

Each of the prepared polarizing plates was cut to prepare a sample having a size of 5 cm×5 cm (width×length). Next, the sample was immersed in water at constant temperature of 60° C. for 2 hours. If the cutter could not be inserted between the protective film and the polarizer, the polarizing plate was rated as ⊚. If the cutter could be slightly inserted between the protective film and the polarizer, the polarizing plate was rated as O. If the protective film was torn during even a slight insertion of the cutter between the protective film and the polarizer, the polarizing plate was rated as Δ. If the cutter could be easily inserted between the protective film and the polarizer, the polarizing plate was rated as X.

(3) Viscosity

Each of the prepared adhesive compositions was stored in a thermostat (at 25° C.) for 24 hours. 400 g of the adhesive composition was then placed in a 500 nil Nalgene bottle (outer diameter of 73.8 mm×height of 169.8 mm) and a Brookfield viscometer DV-II+ with Spindle No. 7 was used to measure viscosity at 25° C. and 100 rpm. The results are shown in Table 2.

TABLE 2

| | Adhesion | | Adhesion after hot water immersion | | |
|---|---|---|---|---|---|
| | TAC surface | COP surface | TAC surface | COP surface | Viscosity (25° C., cPs) |
| Example 1 | ⊚ | ⊚ | O | O | 92 |
| Example 2 | O | ⊚ | ⊚ | O | 90 |
| Example 3 | ⊚ | ⊚ | ⊚ | O | 83 |
| Example 4 | ⊚ | ⊚ | ⊚ | ⊚ | 91 |
| Example 5 | O | ⊚ | ⊚ | ⊚ | 88 |
| Example 6 | O | O | O | ⊚ | 64 |
| Example 7 | ⊚ | O | ⊚ | ⊚ | 55 |
| Example 8 | ⊚ | ⊚ | ⊚ | ⊚ | 21 |
| Example 9 | ⊚ | ⊚ | ⊚ | ⊚ | 44 |
| Comparative Example 1 | O | O | X | X | 73 |
| Comparative Example 2 | O | ⊚ | X | X | 90 |
| Comparative Example 3 | O | ⊚ | X | X | 92 |
| Comparative Example 4 | O | O | X | X | 360 |
| Comparative Example 5 | ⊚ | ⊚ | X | X | 12 |

As shown in Table 2, the polarizing plates including the adhesive layers prepared from the adhesive compositions according to embodiments of the present invention exhibited good adhesion, and could suppress (or reduce) deterioration in adhesion under severe conditions of high temperature and high humidity, such as during hot water immersion. In addition, since some polarizing plates prepared according to embodiments of the present invention showed no change in adhesion after hot water immersion, it is believed that the polarizing plates according to embodiments of the present invention could maintain adhesion even under severe high humidity or humidification conditions. Furthermore, since the polarizing plates of Examples 2, 5 and 7 exhibited improved adhesion after hot water immersion, it is believed that the polarizing plates according to embodiments of the present invention also can have improved water resistance.

According to embodiments of the present invention, the adhesive composition for polarizing plates, when included in an adhesive layer, can exhibit good durability, water resistance and moist heat resistance, as well as good adhesion and reliability due to high cross-linking density, thus allowing the protective film to be bonded to one or both surfaces of the polarizer. Embodiments of the present invention provide an adhesive composition for polarizing plates exhibiting good moisture resistance under severe moisture conditions such as, for example, high humidity environments, environments where the polarizing plate is immersed in water, and the like. Embodiments of the present invention provide a polarizing plate, which includes an adhesive layer including the adhesive composition, and which exhibits good adhesion, reliability, durability, water resistance, and high temperature/high humidity resistance. Embodiments of the present invention also provide a method for preparing the adhesive composition and/or the polarizing plate, and an optical apparatus including the polarizing plate.

Conversely, the polarizing plates of Comparative Examples 1 to 3, which did not include at least one of the alkoxysilane compounds C-D, exhibited significantly lower adhesion after hot water immersion. For example, the polarizing plate of Comparative Example 1, which did not include any of the compounds C or D, exhibited poor adhesion before hot water immersion, and significantly deteriorated adhesion after hot water immersion. In addition, although the polarizing plates of Comparative Examples 2 to 3, which included either one of the alkoxysilane compounds (C) or one of the alkoxysilane compounds (D), exhibited somewhat satisfactory adhesion before hot water immersion, adhesion of both polarizing plates deteriorated significantly after hot water immersion. In addition, the polarizing plate of Comparative Example 5, which did not include the epoxy compound, but included at least one of each of the alkoxysilane compounds B-D, exhibited good adhesion before hot water immersion but, adhesion of polarizing plates deteriorated significantly after hot water immersion. Furthermore, the results indicated that the polarizing plate of Comparative Example 4, which did not include the (meth)acrylic compound, suffered from deteriorations in interfacial adhesion to an adherend.

While certain exemplary embodiments of the present invention have been shown and described, it should be understood that various modifications, changes, alterations, and equivalent embodiments may be made by those skilled in the art without departing from the spirit and scope of the present invention, as defined in the following claims and equivalents thereof.

What is claimed is:

1. A polarizing plate comprising:
    a polarizer;
    a protective film on one or both surfaces of the polarizer; and
    an adhesive layer between the polarizer and the protective film, the adhesive layer comprising a cured product of an adhesive composition for polarizing plates, the adhesive composition comprising:
        an epoxy compound;
        a (meth)acrylic compound;
        an alkoxysilane compound containing at least one epoxy group; and
        an alkoxysilane compound containing at least one (meth)acrylate group.

2. The polarizing plate according to claim 1, wherein the epoxy compound comprises at least one of an alicyclic epoxy compound, an aromatic epoxy compound, an aliphatic epoxy compound, or a hydrogenated epoxy compound.

3. The polarizing plate according to claim 1, wherein the (meth)acrylic compound is present in the adhesive composition in an amount of about 10 wt % to about 90 wt %, based on a total solids content of the adhesive composition.

4. The polarizing plate according to claim 1, wherein the (meth)acrylic compound comprises a monofunctional (meth)acrylate having at least one hydrophilic group.

5. The polarizing plate according to claim 4, wherein the (meth)acrylic compound further comprises a polyfunctional (meth)acrylate.

6. The polarizing plate according to claim 5, wherein the polyfunctional (meth)acrylate comprises at least one of a trimethylolpropane tri(meth)acrylate, a trimethylolpropane (trioxyethyl (meth)acrylate), a tris(2-acryloxyethyl) isocyanurate, or a pentaerythritol tri(meth)acrylate.

7. The polarizing plate according to claim 1, wherein the (meth)acrylic compound comprises at least one of a $C_1$ to $C_{20}$ alkyl group-containing monofunctional (meth)acrylate having at least one hydrophilic group, a $C_3$ to $C_{20}$ alicyclic group-containing monofunctional (meth)acrylate having at least one hydrophilic group, or a $C_6$ to $C_{20}$ aromatic group-containing monofunctional (meth)acrylate having at least one hydrophilic group.

8. The polarizing plate according to claim 1, wherein a polyfunctional (meth)acrylate is present in the adhesive composition in an amount of greater than 0 wt % to less than about 20 wt %, based on a total weight of the monofunctional (meth)acrylate and the polyfunctional (meth)acrylate.

9. The polarizing plate according to claim 1, wherein the alkoxysilane compound containing at least one epoxy group comprises at least one of 3-glycidoxypropyltrimethoxysilane or 2-(3,4-epoxycyclohexyl)ethyltrimethoxysilane.

10. The polarizing plate according to claim 1, wherein the alkoxysilane compound containing at least one (meth)acrylate group comprises at least one of 3-(meth)acryloxypropyltrimethoxysilane or 3-(meth)acryloxypropyltriethoxysilane.

11. The polarizing plate according to claim 1, wherein the alkoxysilane compound containing at least one epoxy group is present in the adhesive composition in an amount of about 0.1 wt % to about 5 wt %, based on a total weight of the epoxy compound, the (meth)acrylic compound, the alkoxysilane compound containing at least one epoxy group, and the alkoxysilane compound containing at least one (meth)acrylate group.

12. The polarizing plate according to claim 1, wherein the alkoxysilane compound containing at least one (meth)acrylate group is present in the adhesive composition an amount of about 0.1 wt % to about 5 wt %, based on a total weight of the epoxy compound, the (meth)acrylic compound, the alkoxysilane compound containing at least one epoxy group, and the alkoxysilane compound containing at least one (meth)acrylate group.

13. The polarizing plate according to claim 1, wherein the adhesive composition further comprises at least one of a photosensitizer or a photoacid generator.

14. The polarizing plate according to claim 13, wherein:
    the epoxy compound is present in the adhesive composition in an amount of about 30 wt % to about 60 wt % based on a total solids content of the adhesive composition;
    the (meth)acrylic compound is present in the adhesive composition in an amount of about 30 wt % to about 60 wt % based on the total solids content of the adhesive composition;
    the alkoxysilane compound containing at least one epoxy group is present in the adhesive composition in an amount of about 0.01 wt % to about 3 wt % based on the total solids content of the adhesive composition;
    the alkoxysilane compound containing at least one (meth) acrylate group is present in the adhesive composition in an amount of about 0.01 wt % to about 3 wt % based on the total solids content of the adhesive composition;

the photosensitizer is present in the adhesive composition in an amount of about 0.01 wt % to about 5 wt % based on the total solids content of the adhesive composition; and the photoacid generator is present in the adhesive composition in an amount of about 0.01 wt % to about 5 wt %, based on the total solids content of the adhesive composition.

15. The polarizing plate according to claim 1, wherein the adhesive composition has a viscosity at 25° C. of about 20 cPs to about 135 cPs.

16. The polarizing plate according to claim 1, wherein the epoxy compound and the (meth)acrylic compound are non-silicon compounds.

17. An optical apparatus comprising the polarizing plate according to claim 1.

* * * * *